United States Patent
Weber et al.

(10) Patent No.: US 6,364,487 B1
(45) Date of Patent: Apr. 2, 2002

(54) SOLID STATE BASED ILLUMINATION SOURCE FOR A PROJECTION DISPLAY

(75) Inventors: Andreas G. Weber, Redwood City; James B. Williamson, Sunnyvale; Gregory M. Cutler, Cupertino, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/240,198

(22) Filed: Jan. 29, 1999

(51) Int. Cl.[7] .............................................. G03B 21/26
(52) U.S. Cl. ........................................................ 353/30
(58) Field of Search ............................... 353/30, 31, 34, 353/37, 82, 20, 98; 349/5, 9; 359/196, 204, 208, 385, 386, 483, 487, 488, 490

(56) References Cited

U.S. PATENT DOCUMENTS

| | | | |
|---|---|---|---|
| 3,566,099 A | | 2/1971 | Makas .......................... 240/9.5 |
| 4,912,614 A | | 3/1990 | Goldenberg ................. 362/347 |
| 4,956,759 A | * | 9/1990 | Goldenberg et al. .......... 362/297 |
| 5,113,279 A | * | 5/1992 | Hanamoto et al. ........... 359/196 |
| 5,146,248 A | * | 9/1992 | Duwaer et al. .............. 353/122 |
| 5,255,171 A | | 10/1993 | Clark .......................... 362/231 |
| 5,387,953 A | * | 2/1995 | Minoura et al. ............... 353/20 |
| 5,844,637 A | * | 12/1998 | Katsumata ....................... 349/8 |
| 5,889,567 A | * | 3/1999 | Swanson et al. ............... 349/62 |
| 6,005,720 A | * | 12/1999 | Watters et al. ............... 359/633 |
| 6,005,722 A | * | 12/1999 | Butterworth et al. ......... 359/712 |
| 6,064,523 A | * | 5/2000 | Budd et al. ................... 358/485 |
| 6,147,725 A | * | 11/2000 | Yuuki et al. ................... 349/65 |

FOREIGN PATENT DOCUMENTS

| | | | |
|---|---|---|---|
| EP | 0837351 A2 | 4/1998 | ........... G02B/27/28 |
| JP | 04184429 | 7/1992 | ........... G03B/21/14 |

OTHER PUBLICATIONS

"Monolithic GaN Light Emitting Diode Arrays for Display Illumination", IBM Technical Disclosure Bulletin, vol. 39, No. 9, Sep. 1996, pp. 227–229.

* cited by examiner

*Primary Examiner*—Safet Metjahic
*Assistant Examiner*—Etienne P LeRoux

(57) ABSTRACT

An illumination source for use in projectors and the like. The illumination source includes a light source that generates a two-dimensional emission pattern having a light intensity that varies as a function of position in the emission pattern. A collector collects the light from the light source and illuminates an exit aperture therewith. The illuminated exit aperture has a two-dimensional emission pattern with a light intensity that varies as a function of position in a manner that is more uniform as a function of position than the emission pattern of the light source. An imaging optical element images the exit aperture onto a surface. The collector is preferably a compound parabolic concentrator or a compound elliptical concentrator. In one embodiment of the invention, a partially reflecting film is placed between the exit aperture and the imaging optical element. The partially reflecting film reflects light of a first polarization state back into the collector and transmits light of the orthogonal polarization state. In another embodiment of the invention, a quarter wave plate is introduced between the exit aperture and the partially reflecting film to further increase the radiance of the source.

2 Claims, 2 Drawing Sheets

SOLID STATE BASED ILLUMINATION SOURCE FOR A PROJECTION DISPLAY

FIELD OF THE INVENTION

The present invention relates to light sources, and more particularly, to a solid state light source for use in projectors and the like.

BACKGROUND OF THE INVENTION

Systems for projecting images onto screens are known in the art. Systems based on incandescent or arc lamps are often used in projection displays. However, such sources have limited lifetimes and poor output stability over the life of the light source. In addition, spectral components, such as UV and IR, that are not needed for display purposes must be filtered out of the emissions to avoid damage to other components or the viewer's eyes.

Sources based on combinations of Light Emitting Diodes (LEDs) or semiconductor lasers that emit red, green and blue light can be used as a solid state light source. Since LED and laser emissions are typically spectrally narrow band light sources, the use of color filters for the display can be omitted. Also the optical output of semiconductor lasers and LEDs can typically be electrically modulated at a rate that is sufficient for a time sequential color display.

Unfortunately, individual solid state light sources do not provide sufficient brightness for many projection display applications; hence, arrays of LEDs must be utilized to obtain sufficient output. A significant fraction of the light generated in an LED array is lost. One common type of projection display utilizes a liquid crystal-based spatial light modulator. Such modulators require the use of linearly polarized light. Since the emission of conventional light sources is unpolarized, the light source includes a polarizing filter that transmits light in the desired linear polarization state and absorbs the perpendicular state. As a result, 50% of the radiance of the light from the source is lost.

Broadly, it is the object of the present invention to provide an improved solid state light source and projection display.

It is a further object of the present invention to provide a light source that provides a white light output utilizing LEDs of different radiances and colors.

It is a still further object of the present invention to provide a polarized light source with an optical output power larger than 50% of the output power of the original unpolarized light source.

These and other objects of the present invention will become apparent to those skilled in the art from the following detailed description of the invention and the accompanying drawings.

SUMMARY OF THE INVENTION

The present invention is an illumination source for use in projectors and the like. The illumination source includes a light source that generates a two-dimensional emission pattern having a light intensity that varies as a function of position in the emission pattern. A collector collects the light from the light source and illuminates an exit aperture therewith. The illuminated exit aperture has a two-dimensional emission pattern with a light intensity that varies as a function of position in a manner that is more uniform as a function of position than the emission pattern of the light source. An imaging optical element images the exit aperture onto a surface. The collector is preferably a compound parabolic concentrator or a compound elliptical concentrator. In one embodiment of the invention, a partially reflecting film is placed between the exit aperture and the imaging optical element. The partially reflecting film reflects light of a first polarization state back into the collector and transmits light of the orthogonal polarization state. In another embodiment of the invention, a quarter wave plate is introduced between the exit aperture and the partially reflecting film to further increase the radiance of the source.

DETAILED DESCRIPTION OF THE INVENTION

Figure 1:
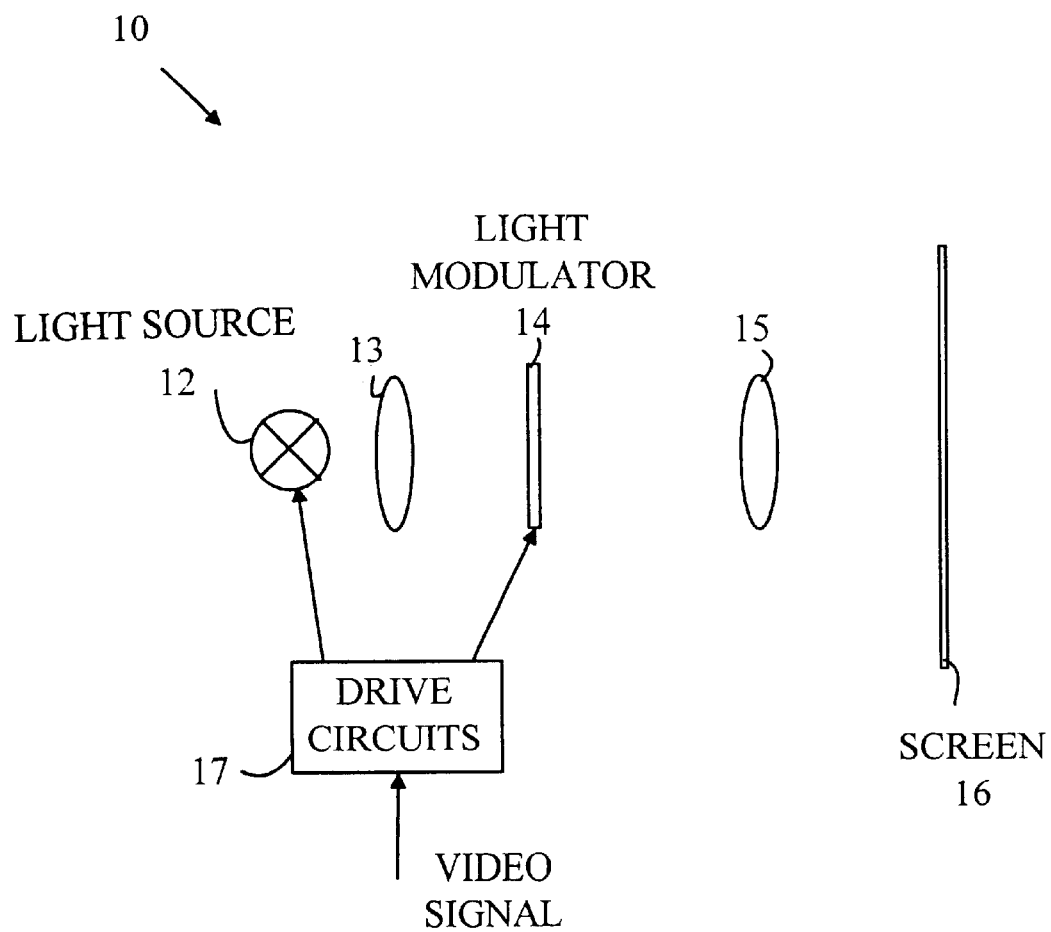
FIG. 1 is a cross-sectional view of a prior art projection system.

The present invention may be more easily understood with reference to FIG. 1 which is a cross-sectional view of a prior art projection system. Projection system 10 utilizes an illumination source 12 to illuminate a liquid crystal light modulator 14. An optical system 13 images the light from the light source onto the light modulator. The modulator can be of the reflective or transmissive type. For reflective displays a polarizing beam splitter can be utilized to separate the illumination and imaging path or an off axis illumination scheme can be utilized. The light modulator is, in turn, imaged onto a screen 16 by an optical system 15. A color image is produced by sequentially displaying red, blue, and green images in a time frame that is sufficiently short that the eye does not perceive the separate images. Hence, light source 12 must be capable of quickly switching between the various component colors. The component video signals are decoded by drive circuits shown at 17.

As noted above, the light output of individual LEDs or laser diodes is insufficient to provide the required illumination. Hence, light source 12 is constructed from arrays of LEDs or laser diodes. To simplify the following discussion, embodiments based on LEDs will be discussed; however, it is to be understood that similar embodiments based on arrays of laser diodes can also be utilized without departing from the teachings of the present invention. While the effective brightness of the light source can be increased by utilizing arrays of LEDs, there is a limit to the physical size of the light source.

To maximize the display brightness, the source area, the collection angle of the collimating optics and the radiance (optical power/area/solid angle) of the solid state light emitters must all be optimized. The useful solid angle and area of the light source are determined by the etendu of the optical system of the projection display. The etendu of an optical element is its aperture multiplied with the solid angle of the light that is relayed through this element. The etendu of a system is the minimum occurring etendu of its individual optical components. Given the etendu of the optical display system and the collection angle of the collimating optics the maximum useful light source area is determined. This area has to be covered with as many solid state emitters of maximum available radiance as possible in order to provide maximum display brightness.

To provide a full color display, a solid state light source has to include emitters of at least three different colors arranged in a mosaic pattern. In order to maximize the brightness of a color display, the relative area covered by emitters of each color has to be adjusted according to the respective emitter radiance. If all emitters are driven simultaneously the resulting color shining onto the light modulator has to be white. The fraction of the source area covered by each kind of color emitter is given by:

$$\frac{A_{ci}}{A_{total}} = \frac{P_{ci}}{D_{ci} * \left(\frac{P_{c1}}{D_{c1}} + \frac{P_{c2}}{D_{c2}} + \frac{P_{c3}}{D_{c3}}\right)} \quad (i = 1\ldots 3) \quad (1)$$

Here, c1, c2, and c3 denote the three spectral emitters, $P_{c1}$, $P_{c2}$ and $P_{c3}$ denote the total optical power required for each emitted color c1, c2 and c3, respectively, to generate white light at the display output. $D_{c1}$, $D_{c2}$, and $D_{c3}$ denote the emitted power/area of the individual solid state color emitters that reach the display screen. Finally, $A_{ci}/A_{total}$ (i=1.3) is the fraction of the total source area that is covered by the emitters of one color. Hence, the mosaic pattern must accommodate different individual emitter dimensions. Furthermore the pattern of the individual solid state color emitters has to provide good mixing of the different color emitters in order to maximize the uniformity of illumination at the light valve of each individual color. Since the various color emitters have significantly different radiances, the areas devoted to each type of color emitter must be adjusted.

The role of collimating optics 13 is to collect light from the source area emitted into a certain solid angle. Most projection displays use lenses or mirrors to collimate the light emanating from the source. These two types of optical elements create an image of the source and maintain its etendu, hence the product of area times solid angle of the light source and its image is constant. As a result, the radiance of the source is maintained, resulting in a maximum brightness of the display system. This system assumes that the light source is spatially uniform.

Unfortunately, LED arrays do not provide a spatially uniform light source. To correct for the non-uniformity, the image plane of the light source is chosen such that it does not coincide with the position of the light modulator. The further the source is imaged from the modulator the better the intensity uniformity of the display. However, since the diameter of the waist of the light bundle is minimal at the image of the light source, placing this image plane off the light modulator results in a loss of radiance, hence a reduction in display brightness.

Figure 2:
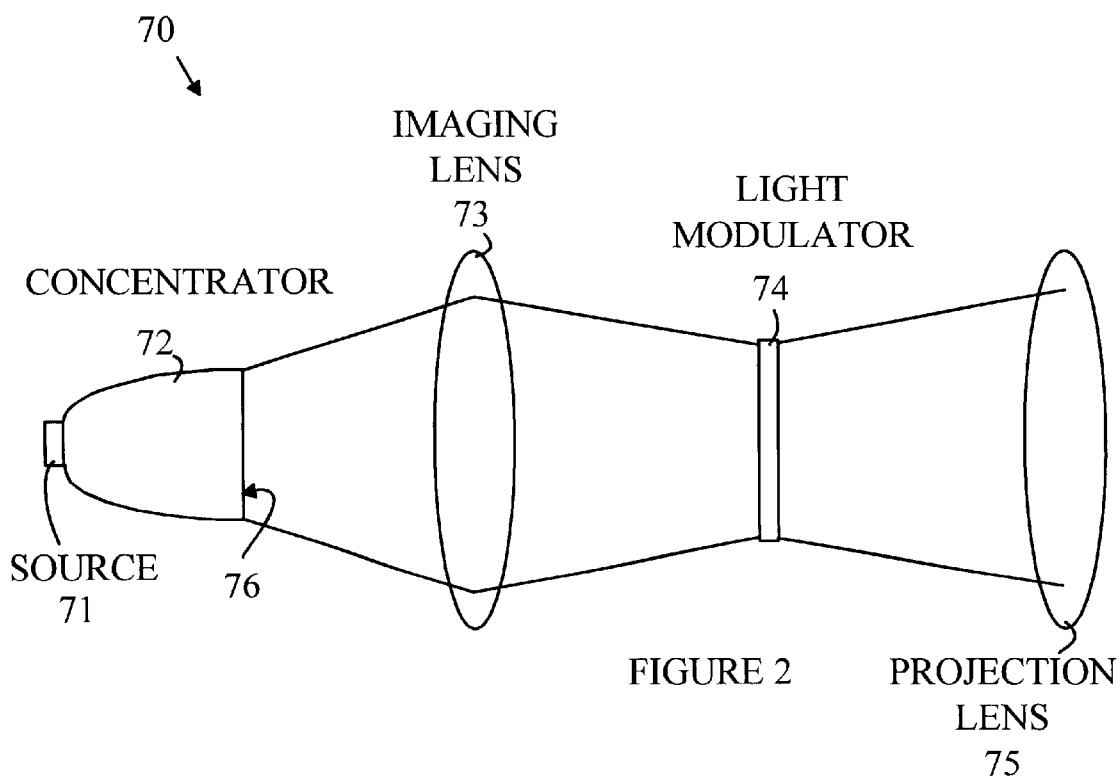
FIG. 2 is a cross-sectional view of a projection system utilizing an illumination source according to the present invention.

The present invention overcomes this limitation by utilizing a combination of a non-imaging collimating element and an imaging element. For the purposes of this discussion, a non-imaging element is an optical element that does not create an image of the input object. The reader is directed to Welford, Winston, "High Collection Nonimaging Optics", Academic Press Inc. '89, ISBN 0-12-742885-2 for a more detailed discussion of such elements. Refer now to FIG. 2, which is a cross-sectional view of a projection system 70 according to the present invention. A non-imaging element 72 such as a Compound Parabolic Concentrator (CPC) or a Compound Elliptical Concentrator (CEC) maintains the etendu of light source 71 but does not image the source. At the exit aperture 76 of a CPC, the optical intensity is fairly uniform. A lens 73 that images the CPC exit aperture onto the light modulator 74 also maintains the etendu of the light source. Therefore the combination of a non-imaging and an imaging optical element used for collimation of the light source provides maximum radiance at the light modulator, and hence, maximum display brightness. Projection system 70 utilizes a projection lens 75 to image light modulator 74 onto the projection screen.

In many applications, a linearly polarized light source is required. For example, when the light modulator shown in FIG. 2 is based on a liquid crystal, the liquid crystal can be illuminated with linearly polarized light. Since the emission of conventional light sources is unpolarized, prior art light sources typically include a polarizing filter that transmits light in the desired linear polarization state and absorbs the perpendicular state. While such light sources provide the desired polarization, 50% of the radiance of the light source can not be utilized.

In principle, solid state emitters that emit polarized light can be utilized to construct the light source. For example, arrays of Vertical Cavity Surface-Emitting Lasers (VCSELs) could be utilized. However, such light sources are not commercially available.

In the preferred embodiment of the present invention this loss of radiance is significantly reduced by the use of a reflector that reflects light of one linear polarization and transmits light of the orthogonal polarization. Such reflectors are available commercially from 3M Corporation under the trade name DUAL BRIGHTNESS ENHANCEMENT FILM (DBEF).

Figure 3:
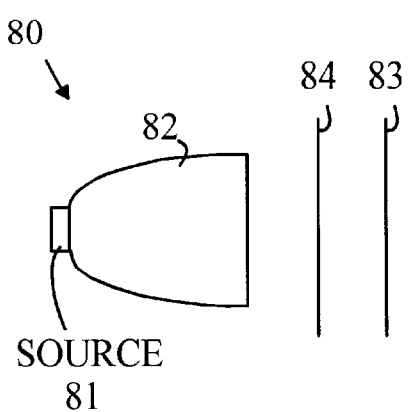
FIG. 3 is a cross-sectional view of an illumination source according to the present invention that utilizes a partially reflecting film to enhance the light output of the illumination source.

Refer now to FIG. 3, which is a cross-sectional view of a light source 80 according to the present invention that utilizes a DBEF to improve the effective radiance of the source. Light source 80 includes a LED or other light source 81 and a concentrator 82, which is preferably a CPC or CEC as described above. A DBEF 83 is placed between the concentrator and the light modulator. DBEF 83 is oriented such that the direction of light required by the light modulator passes through DBEF 83. The light of the orthogonal polarization is reflected back into the source and, in turn, reflected back onto DBEF 83. The polarization of the reflected light partially changes due to scatter and reflection at the source. Therefore a fraction of the reflected unwanted polarized light is converted into the desired polarization state and passes through DBEF 83, thus enhancing the radiance of the source.

DBEF 83 can be combined with a spectrally broadband quarter wave plate 84 with its optical axis aligned at an angle of 45 degrees relative to the optical axis of the DBEF material to further enhance the radiance of the light source 80. The DBEF reflected light passes twice through wave plate 84 and is reflected by the source, therefore its polarization is converted to the desired polarization state. This enhances the fraction of the reflected light that is converted into the desired state, thus increasing the radiance of the light source.

While the above-described embodiment of the present invention generated linearly polarized light, embodiments that generate circularly polarized light may also be constructed. Similar films are available that transmit light of one circular polarization state and reflect the opposite circular polarization state.

Various modifications to the present invention will become apparent to those skilled in the art from the foregoing description and accompanying drawings. Accordingly, the present invention is to be limited solely by the scope of the following claims.

What is claimed is:

1. An illumination source comprising:

a light source;

a collector for collecting light from said light source and illuminating an exit aperture therewith, said collector comprising a non-imaging optical element;

an imaging optical element for imaging said exit aperture onto a surface; and a partially reflecting film located between said exit aperture and said imaging optical element, said partially reflecting film reflecting light of a first polarization state back into said collector and transmitting light of an orthogonal polarization state.

2. The illumination source of claim 1 further comprising a quarter wave plate between said collector and said partially reflecting film.

* * * * *